No. 648,003. Patented Apr. 24, 1900.
G. S. ULLOM.
SHIELD FOR CULTIVATORS.
(Application filed Sept. 6, 1899.)

(No Model.)

Witnesses  G. S. Ullom, Inventor.
By his Attorneys,

UNITED STATES PATENT OFFICE.

GEORGE S. ULLOM, OF POMONA, KANSAS.

SHIELD FOR CULTIVATORS.

SPECIFICATION forming part of Letters Patent No. 648,003, dated April 24, 1900.

Application filed September 6, 1899. Serial No. 729,637. (No model.)

*To all whom it may concern:*

Be it known that I, GEORGE S. ULLOM, a citizen of the United States, residing at Pomona, in the county of Franklin and State of Kansas, have invented a new and useful Shield for Cultivators, of which the following is a specification.

This invention relates to cultivators in general, and more particularly to shields therefor, and, while especially adapted for the shielding of corn, it will be readily seen from the following description that it is applicable in the cultivation of other plants.

The object of the invention is to provide, in connection with a cultivator, a shield which will travel with the cultivator and will receive the clods from the shovels of the latter and deposit them between the rows, at the same time permitting the fine earth to sift through and about the stalks of the plants.

Figure 1:
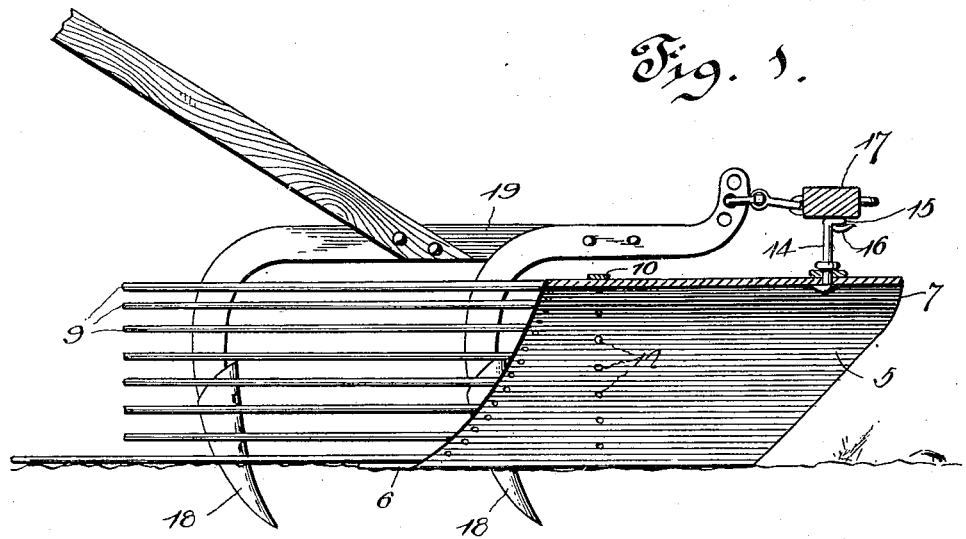
Figure 2:
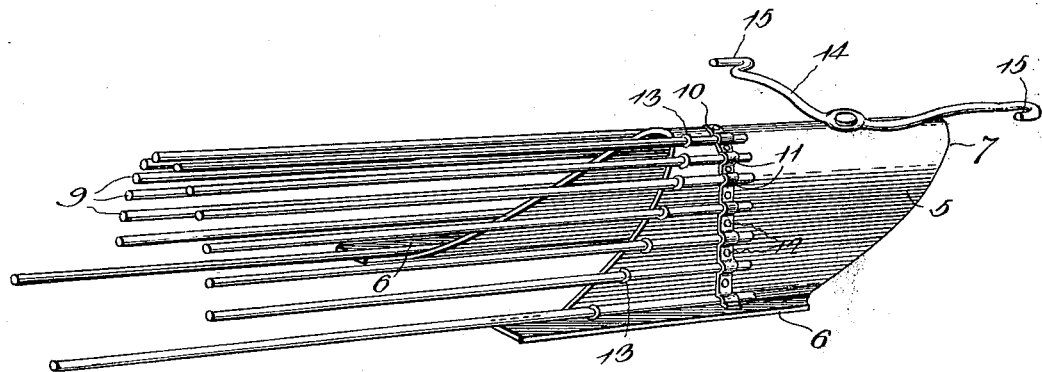

In the drawings forming a portion of this specification, and in which like numerals of reference indicate similar parts in both views, Figure 1 is a longitudinal section of the shield and a cultivator to which it is attached. Fig. 2 is a perspective view of the shield detached.

Referring now to the drawings, the shield consists of a forward portion 5, formed of sheet metal and bent in the form of a housing, the edges at the ends of the chute being bent outwardly to lie in the common plane and form runners 6, which are adapted to rest upon the earth and support the device in the operation of the latter.

The front end of the housing 5 is slanted forwardly and upwardly and has a rounded nose 7, the rear end of the housing being curved from the upper portion downwardly and rearwardly.

The cross-section of the housing 5 is substantially semi-elliptical, and fixed to the outer surface thereof and extending rearwardly therefrom and mutually parallel is a series of bars 9, the transverse arrangement of which is semi-elliptical in conformity with the cross-section of the housing. The forward ends of these bars are fastened to the outer surface of the housing by means of a metallic strap 10, comprising outwardly-extending corrugations 11, intermediate which are disposed the rivets 12, passing through the strap and the housing, holding the strap upon the housing and clamping the bars in place. In the rear of the strap 10 the bars 9 are passed through supporting-eyes 13, lying adjacent the rear end of the housing and conforming in arrangement to the curvature thereof.

Upon the top of the housing 5 and adjacent the forward end thereof is pivoted a singletree or similar connection 14, having hook ends 15, adapted for engagement with hooks or eyes 16 upon a singletree 17 or corresponding cross-beam of a cultivator comprising the shovels 18 and frame 19.

This shield is disposed at the center of the cultivator and in a position to pass along the row of corn, with a runner 6 at each side thereof, the clods and dirt from the shovels falling upon the housing and upon the bars 9, those clods engaging the housing and rolling therefrom, while the softer clods which engage the bars are broken and, together with the pulverized dirt, sift between the bars and fall about the stalks of the corn. The bars 9 have more or less elasticity and consequent yieldability, whereby the jolting and jarring of the implement causes vibration of the rods or bars, the effect of which is to assist in the mashing of the soft clods which may lodge between them and insuring the discharge of the hard clods, which might otherwise become wedged.

It will be seen upon reference to Fig. 1 of the drawings that the housing receives the clods from the foremost shovel 18, and which shovel at each side of the row is the most inwardly disposed. The clods falling upon the housing are of course larger and more objectionable because of being harder than those turned up by the succeeding shovels, for the reason that the forward shovels engage the unbroken ground, and the solidity of the housing prevents injury by the larger and harder clods and at the same time permits the softer dirt being scraped along the housing and falling between the bars. Moreover, the rear shovels being some distance from the bars, the larger clods do not reach the bars.

It will of course be understood that in practice this shield may be employed in connection with any form of implement to which it is adaptable, and also that any desired method of connection may be employed, and that the proportions and material thereof, as also the specific structure, may be varied without departing from the spirit of the invention.

What I claim is—

1. In a cultivator-shield, the combination with a forward housing having its lower edges bent outwardly to form runners, of spaced bars connected with the housing and extending rearwardly thereof, and adapted to permit the passage of earth therebetween.

2. In a cultivator-shield, the combination with a continuous housing having runners and adapted for attachment to a cultivator, of a plurality of parallel flexible and elastic bars connected with the housing and adapted for the passage of earth therebetween.

3. In a cultivator-shield, the combination with a continuous housing having runners, of a plurality of flexible and elastic bars connected with the housing and extending rearwardly thereof.

4. In a cultivator-shield, the combination with a housing adapted for the attachment to a cultivator, and having runners, the rear end of the housing being curved downwardly and rearwardly, of a plurality of flexible and elastic bars disposed mutually parallel and connected with the housing and extending rearwardly therefrom.

5. In a cultivator-shield, the combination with a continuous housing, having runners, of a bar at each side of the housing extending rearwardly thereof and lying directly above the adjacent runner, and a plurality of shorter and parallel bars connected with the housing above the first-named bars.

In testimony that I claim the foregoing as my own I have hereto affixed my signature in the presence of two witnesses.

GEORGE S. ULLOM.

Witnesses:
E. G. SWAYZE,
A. F. HAYNES.